United States Patent
Sugiyama et al.

(10) Patent No.: US 7,283,493 B2
(45) Date of Patent: Oct. 16, 2007

(54) SYSTEM AND METHOD FOR SWITCHING BETWEEN FREQUENCY CHANNELS IN WIRELESS LAN

(75) Inventors: Keizo Sugiyama, Saitama (JP); Naoki Fuke, Saitama (JP); Hideyuki Shinonaga, Saitama (JP)

(73) Assignee: KDDI Corporation, Tokyo (JP)

( * ) Notice: Subject to any disclaimer, the term of this patent is extended or adjusted under 35 U.S.C. 154(b) by 944 days.

(21) Appl. No.: 10/085,034

(22) Filed: Mar. 1, 2002

(65) Prior Publication Data

US 2002/0126635 A1 Sep. 12, 2002

(30) Foreign Application Priority Data

Mar. 6, 2001 (JP) .............................. 2001-061924

(51) Int. Cl.
*H04Q 7/00* (2006.01)
*H04J 1/00* (2006.01)

(52) U.S. Cl. ........................................ 370/329; 370/343

(58) Field of Classification Search ................ 370/329, 370/328, 342, 444, 338, 343, 310, 344; 455/450, 455/464, 509, 425, 452.2, 78, 436, 31.2, 455/31.3; 725/120, 119, 78, 82, 111; 375/132; 340/311.1, 825.44, 825.45, 825.46, 825.47, 340/825.48

See application file for complete search history.

(56) References Cited

U.S. PATENT DOCUMENTS 5,898,904 A * 4/1999 Wang .......................... 340/7.27
6,826,409 B2 * 11/2004 Kostic et al. ................. 455/501
6,834,045 B1 * 12/2004 Lappetelainen et al. ..... 370/329
2002/0060995 A1 * 5/2002 Cervello et al. ............. 370/332
2002/0118724 A1 * 8/2002 Kishimoto et al. .......... 375/132
2004/0172658 A1 * 9/2004 Rakib et al. ................. 725/120
2005/0197131 A1 * 9/2005 Ikegami ...................... 455/450

FOREIGN PATENT DOCUMENTS

| JP | 60-241339 | 11/1985 |
|---|---|---|
| JP | 1-174023 | 7/1989 |
| JP | 01174023 A * | 7/1989 |

* cited by examiner

*Primary Examiner*—Doris H. To
*Assistant Examiner*—Kerri M Rose
(74) *Attorney, Agent, or Firm*—Kratz, Quintos & Hanson, LLP

(57) ABSTRACT

A wireless LAN system comprising a plurality of wireless stations, and a switching apparatus for switching a frequency channel used between stations communicated with each other. The switching apparatus includes means for selecting the frequency channel to be used, and means for sending a switching request packet for specifying the selected frequency channel to the stations. Each of the stations include means for switching a current frequency channel to the frequency channel specified by the switching request packet received.

15 Claims, 5 Drawing Sheets

SYSTEM AND METHOD FOR SWITCHING BETWEEN FREQUENCY CHANNELS IN WIRELESS LAN

FIELD OF THE INVENTION

The present invention relates to a system and a method for switching between frequency channels in a wireless LAN (Local Area Network).

DESCRIPTION OF THE RELATED ART

Recently, in offices or homes, the wireless LAN is used from a viewpoint of easy installation and low cost.

In the wireless LAN, a transmission speed tends to fall by the interference from other existing wireless systems. For example, with 2.4 GHz band, a part of ISM (Industrial, Scientific and Medical) band is used by the wireless LAN. Thus, there is the interference from an ISM apparatus such as a microwave oven.

In Japan, the frequency band assigned to the 2.4 GHz wireless LAN was expanded to 83.5 MHz from 2.400 GHz to 2.4835 GHz in October, 1999. In this expanded band, a maximum of four frequency channels can be used. Thus, an optimum frequency channel with no influence of the interference can be selected. Therefore, a plurality of stations is enabled to communicate simultaneously without interfering each other.

In the conventional station, when the wireless LAN system is installed, it is necessary for a system administrator to research influence of the interference, and to select an appropriate frequency channel. When a user reports a falling of transmission speed, or when the console of the station detects an error, the system administrator needs to manually switch the current frequency channel to another frequency channel.

However, the influence of the interference in the wireless LAN changes dynamically with the operating conditions of the frequency in other systems. Therefore, according to the conventional system and method, it cannot respond quickly to a changing of interference. That is, it is difficult to prevent or reduce a packet loss, a retransmission or a line disconnection depending upon the change in interference.

SUMMARY OF THE INVENTION

It is therefore an object of the present invention to provide a system and a method for switching dynamically a frequency channel for the wireless LAN, based on an line status between stations communicated with each other.

According to the present invention, a wireless LAN system including a plurality of wireless stations and a switching apparatus for switching a frequency channel used between stations communicated with each other. The switching apparatus includes a unit for selecting a frequency channel to be used, and a unit for sending a switching request packet for specifying the selected frequency channel to the stations. Each of the stations include a unit for switching a current frequency channel to the frequency channel specified by the switching request packet received.

It is preferred that the switching apparatus further includes a manager for collecting a line status information indicating varying status of lines between the stations, and a unit for judging whether a frequency channel switching is executed based on the line status information. Each of the station further includes an agent for sending the line status information to the manager in the switching apparatus. The selection unit in the switching apparatus selects the frequency channel based on a judgment of the judging unit.

It is preferred that the line status information includes information of the total number of packets and the number of error packets.

It is preferred that the manager in the switching apparatus communicates with the agent in the station based on Simple Network Management Protocol.

It is preferred that the selection unit in the switching apparatus selects a frequency channel so that a polarized wave of the frequency channel to be selected does not overlap polarized waves of neighbor frequency channels.

It is preferred that the station further comprises a switching control unit for controlling a switching of frequency channels. The switching control unit sends and receives a switching confirmation packet between the stations in each of which the frequency channel is switched in response to the switching request packet received from the switching apparatus. When the switching confirmation packet does not be received from other station, the switching control unit resets the frequency channel to a previous frequency channel earlier than receiving the switching request packet. The switching control unit sends a response packet indicating of whether the switching confirmation packet has been received to the switching apparatus as a switching result.

It is preferred that the switching control unit in the switching apparatus sends a switching request packet to all of the stations so that the station is reset to the previous frequency channel earlier than receiving a switching request packet, when at least one of the switching results received from the stations is unsuccessful.

It is preferred that the stations consist of one parent-station and child-stations. The agent in each of the parent-station and the child-stations counts a percentage value the number of success packets occupied in the total number of packets for each wireless link between the parent-station and each child-station, and sends a percentage value for each wireless link to the switching apparatus. The manager in the switching apparatus receives the percentage value. The switching judgment unit judges whether the switching of frequency channel is executed, based on the number of the wireless links that have percentage values smaller than a threshold.

It is preferred that the switching judgment unit in the switching apparatus dynamically modifies the threshold based on the number of switching times per unit time.

According to the present invention, a method for switching a frequency channel communicated between stations for wireless LAN by a switching apparatus. The method comprises steps of, in the switching apparatus, selecting a frequency channel to be used, in the switching apparatus, sending a switching request packet for specifying the selected frequency channel to the station, and in the station, switching a current frequency channel to the frequency channel specified by the switching request packet received.

It is preferred that the method further comprises steps of, in the switching apparatus, collecting a line status information indicating varying status of lines between the stations, and judging whether a frequency channel switching is executed based on the line status information, in the station, sending the line status information to the switching apparatus, The selecting step in the switching apparatus selects the frequency channel based on a judgment of the judging step.

It is preferred that the line status information includes information of the total number of packets and the number of error packets.

It is preferred that the switching apparatus communicates with the station based on Simple Network Management Protocol.

It is preferred that the selecting step in the switching apparatus selects a frequency channel so that a polarized wave of the frequency channel to be selected does not overlap a polarized wave of other neighbor frequency channels.

It is preferred that the method further comprises, in the station, a switching control step for controlling a switching of frequency channels. The switching control step sends and receives a switching confirmation packet between the stations in each of which the frequency channel is switched in response to the switching request packet received from the switching apparatus. When the switching confirmation packet does not be received from other station, the switching control step resets the frequency channel to a previous frequency channel earlier than receiving the switching request packet. The switching control step sends a response packet indicating of whether the switching confirmation packet has been received to the switching apparatus as a switching result.

It is preferred that the switching control step in the switching apparatus sends a switching request packet to all of the stations so that the station is reset to the previous frequency channel earlier than receiving the switching request packet again, when at least one of the switching results received from the stations is unsuccessful.

It is preferred that the stations consist of one parent-station and a plurality of child-stations, wherein the parent-station and the child-stations count a percentage value per unit time of the number of success packets occupied in the total number of packets for each wireless link between the parent-station and each the child-station. The line status information sending step sends a percentage value for each wireless link to the switching apparatus. The switching apparatus comprises steps of receiving the percentage value. The switching judgment step judges whether the switching of frequency channel is executed, based on the number of the wireless links that the percentage value is smaller than a threshold.

It is preferred that the switching judgment step in the switching apparatus dynamically modifies the threshold based on the number of switching times per unit time.

Further objects and advantages of the present invention will be apparent from the following description of the preferred embodiments of the invention as illustrated in the accompanying drawings.

DESCRIPTION OF THE PREFERRED EMBODIMENTS

Figure 1:
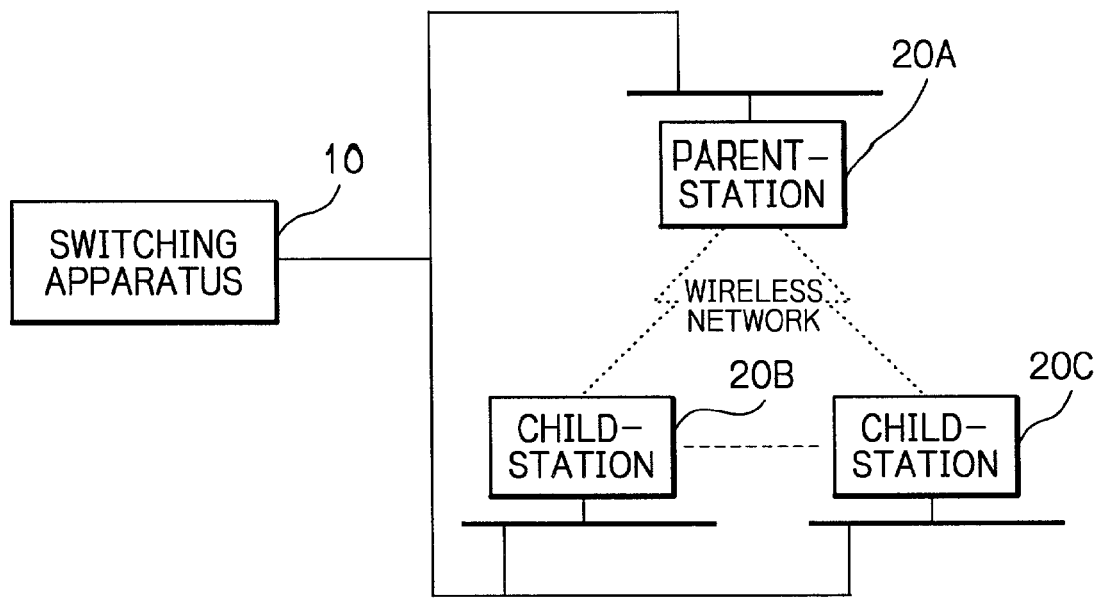
FIG. 1 shows a system configuration according to the present invention.

FIG. 1 shows a system configuration according to the present invention. The system is of a wireless LAN of point-to-multipoint type with a parent-station 20A and child-stations 20B and 20C. Of course, the present invention is applicable also to a wireless LAN of a point-to-point type. A switching apparatus 10 is connected to the stations 20A, 20B and 20C through a wire or wireless network. The switching apparatus 10 switches frequency channels in the wireless LAN constructed among these stations.

The switching apparatus 10 monitors a line status of the wireless LAN among the stations 20A, 20B and 20C. This monitoring is executed by polling, for example. Furthermore, the switching apparatus 10 controls the switching of frequency channels based on the monitored line status. The monitoring or controlling procedure may use a SNMP (Simple Network Management Protocol) in a network management protocol. More concretely, the switching apparatus 10 operates as a manager, and the stations 20A, 20B and 20C operates as agents. The switching apparatus 10 will send a management request packet or a switching request packet of the frequency channel, to the stations. Then, the stations 20A, 20B and 20C will send back response packets to the switching apparatus 10, respectively.

Figure 2:
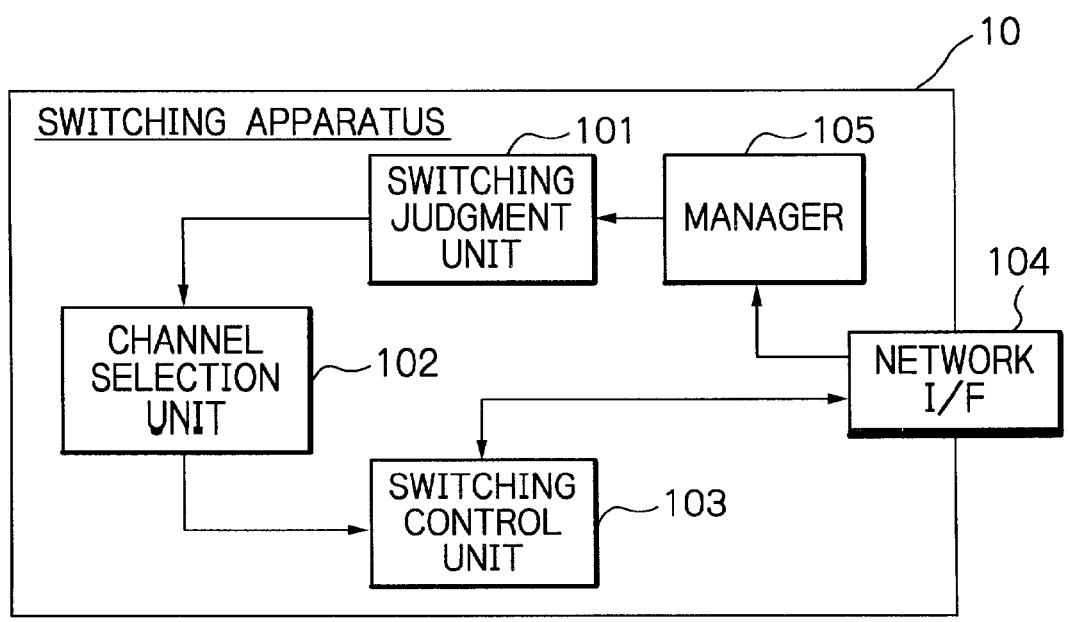
FIG. 2 shows a block diagram illustrating a configuration of a switching apparatus according to the present invention.

FIG. 2 shows a block diagram illustrating a configuration of the switching apparatus according to the present invention. As shown in FIG. 2, the switching apparatus 10 consists of a switching judgment unit 101, a channel selection unit 102, a switching control unit 103, a network I/F (interface) unit 104 and a manager (network management unit) 105.

Figure 3:
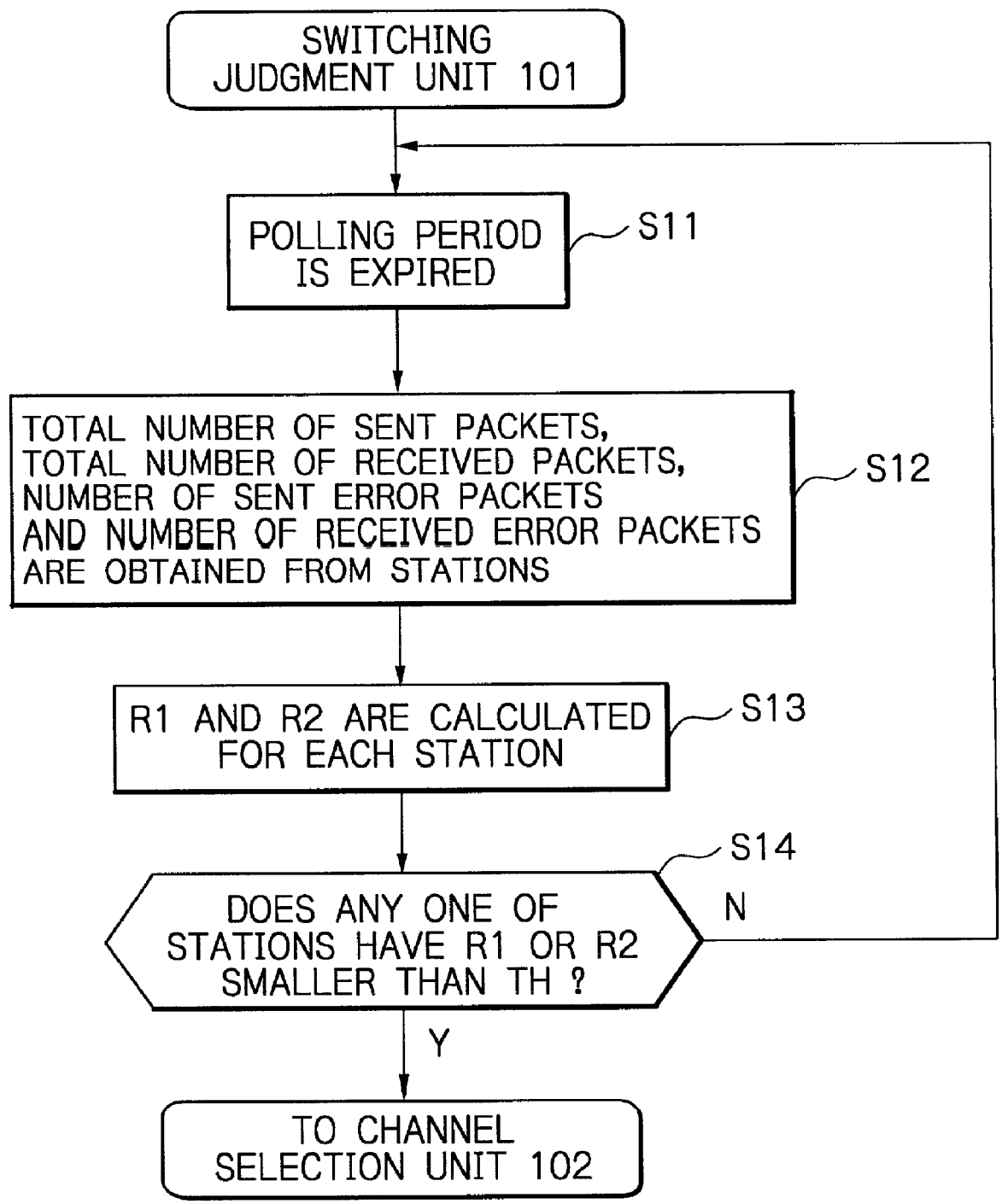
FIG. 3 shows a flowchart illustrating operations of a switching judgment unit.

FIG. 3 shows a flowchart illustrating operations of the switching judgment unit 101. When a polling period is expired at step S11, the unit 101 sends a management request packet to the stations and responses are obtained from the stations at step S12. The responses include the total number of sent packets, the total number of received packets, the number of sent error packets and the number of received error packets. The number of sent error packets may be for example the number of the ACK (acknowledge) packets failed to receive at the sender station of the data packets within a predetermined time. The number of received error packets may be for example the number of the data packets canceled by an error-detection unit in the receiver station of the data packets, such as CRC (Cyclic Redundancy Check).

Then, at step S13, ratios R1 and R2 are calculated for each station by using the following formula. The ratio R1 is a percentage of the number of successfully sent packets occupied in the total number of sent packets. And, the ratio R2 is a percentage of the number of successfully received packets occupied in the total number of received packets. Namely, $R1$=(the total number of sent packets−the number of sent error packets)/(the total number of sent packets), and $R2$=(the total number of received packets−the number of received error packets)/(the total number of received packets).

Each station usually counts and holds these numbers of packets. In this case, the numbers of packets within the polling periods are obtained by subtracting the numbers of packets acquired at the last polling from the numbers of packets acquired at the time polling, respectively.

At step 14, the ratio R1 and R2 of each station are compared with a threshold TH. If any one of the stations has the ratio R1 or R2 smaller than the threshold TH, it is judged that the wireless network is declined in the network quality. This judgment is notified to the channel selection unit 102. Otherwise, the numbers of packets are again acquired at the following polling period, and the above-mentioned judgments are periodically repeated.

Figure 4:
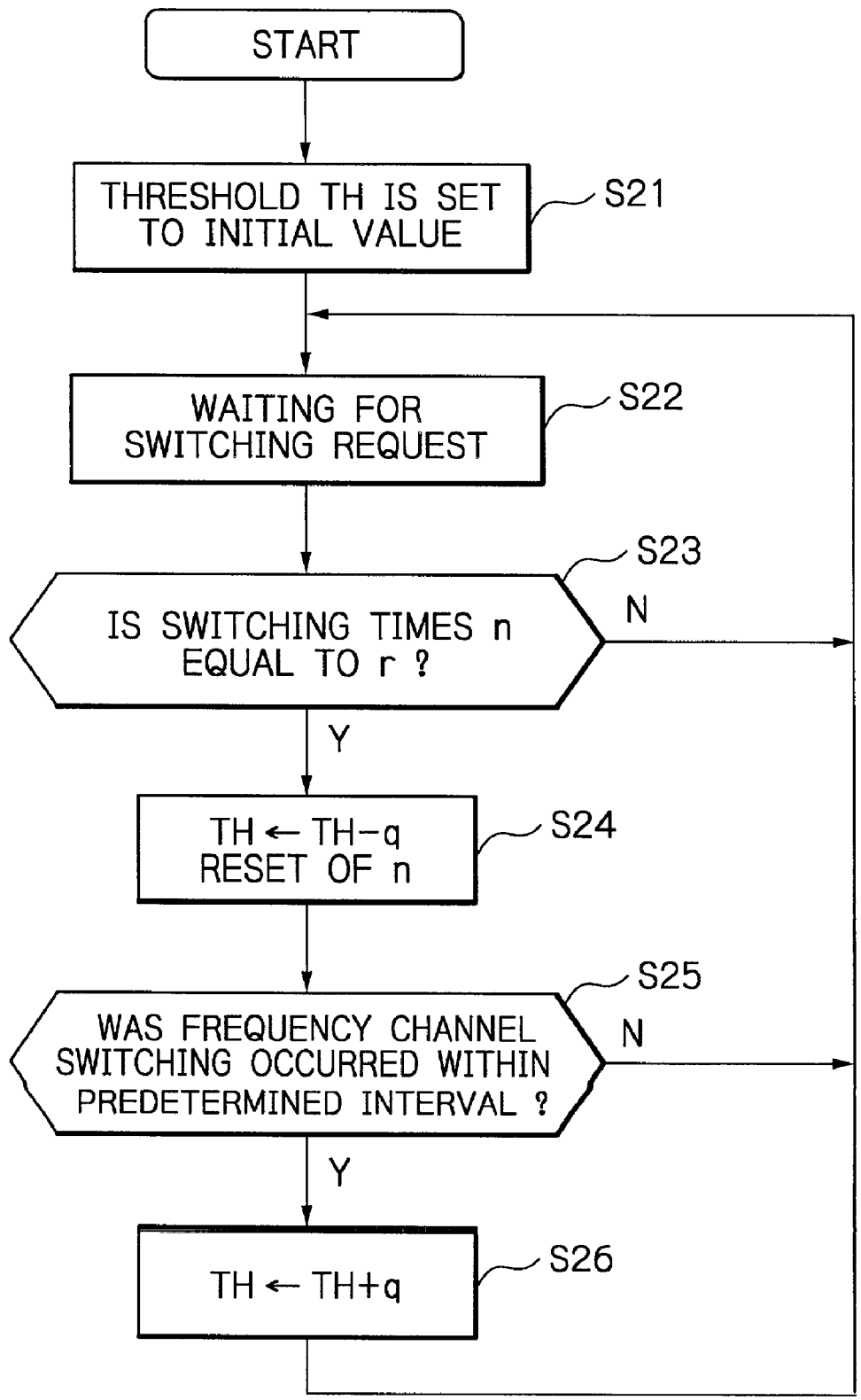
FIG. 4 shows a flowchart illustrating operations for determining a threshold TH in the switching judgment unit.

FIG. 4 shows a flowchart illustrating operations for determining the threshold TH in the switching judgment unit 101. This TH is a value between 0 and 1. First, an initial value is set to TH at step S21. For example, The threshold TH may be set for example to 0.9. Then, at step S22, the station becomes in a waiting state until the next channel switching request. When a channel switching request packet is received, the judgment unit 101 compares the switching times "n" with a set value "r" at step S23. For example, it assumes that the "r" is four. If the switching times "n" becomes four, the operation goes to step S24, and otherwise it returns to step S22.

At step S24, the station judges that a decline in the network quality such as interference is occurring. Then, TH is decreased by a set value "q", and thereby, switching of the frequency channels is performed in a shorter. Also, at step S24, the switching times "n" is reset to zero. For example, if "q" is 0.05, TH will be set to 0.85.

At step S25, it is judged whether the frequency channel switching was occurred within a predetermined interval or not. If the switching was occurred within the interval, since the network quality is declining, the operation returns to step S22. Otherwise, since the network quality is improving, TH is increased by "q" at step S26. Therefore, TH is changed between 0 and 1.

Figure 5:
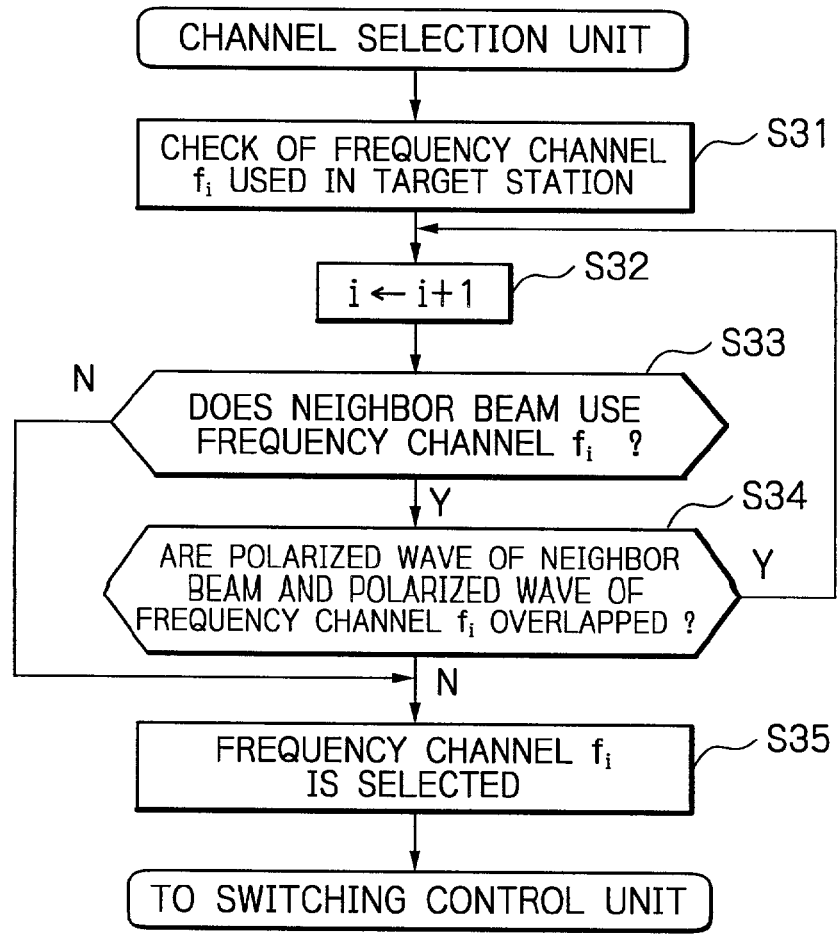
FIG. 5 shows a flowchart illustrating operations of a channel selection unit.

FIG. 5 shows a flowchart illustrating operations of the channel selection unit 102. Suppose that a plurality of the frequency channels (f1, f2, ..., fi, ..., fn) can be used. At step S31, the current frequency channel "fi" used in the target station is checked. This can be achieved if the switching apparatus 10 sends the management request packet of SNMP to the stations, and receives the responses.

At step S32, the channel number "i" is incremented, and the frequency channel "fi" is a candidate of the next frequency channel. For example, when "f2" is used at present, "f3" becomes the candidate.

At step S33, it checked whether the channel "fi" is used in a neighbor beam of the station. If not used, the channel "fi" is selected at step S35. If used in the neighbor beam, it is judged that the interference may occur at the frequency of "fi", and then the operation goes to step S34.

At step S34, it is checks whether a polarized wave (vertical, horizontal, etc.) of the frequency channel "fi" is used in the neighbor beam. If the polarized wave does not overlap, since the interference is avoidable, the channel "fi" is selected at step S35. If it overlaps, the operation returns to step S32, and the same transaction is repeated about the candidate of the following frequency channel "fi+1". If the frequency channels and the polarized waves are overlapped each other over all the frequency channels (f1, f2, ..., fi, ..., fn), a specific process such as a step of executing no frequency channel switching is performed.

Then, the switching control unit 103 sends a switching request packet of the frequency channel "fi" selected by the channel selection unit 102.

If at least one of the stations fails in the frequency channel switching, a normal communication cannot be achieved. Thus, the switching control unit 103 sends a management request packet to inquire whether the frequency channel switching in each station was successful or not. If all responses from the stations are success, it is judged that the switching in the stations was executed normally. If at least one response is failure of the switching or is not received, it is judged that the switching transaction was failed. In the latter case, the switching control unit 103 sends a switching request packet for resetting the frequency channel to a previous frequency channel earlier than the switching to all stations. The switching control unit 103 therefore needs to hold the channel number "i" of the previous frequency channel.

Figure 6:
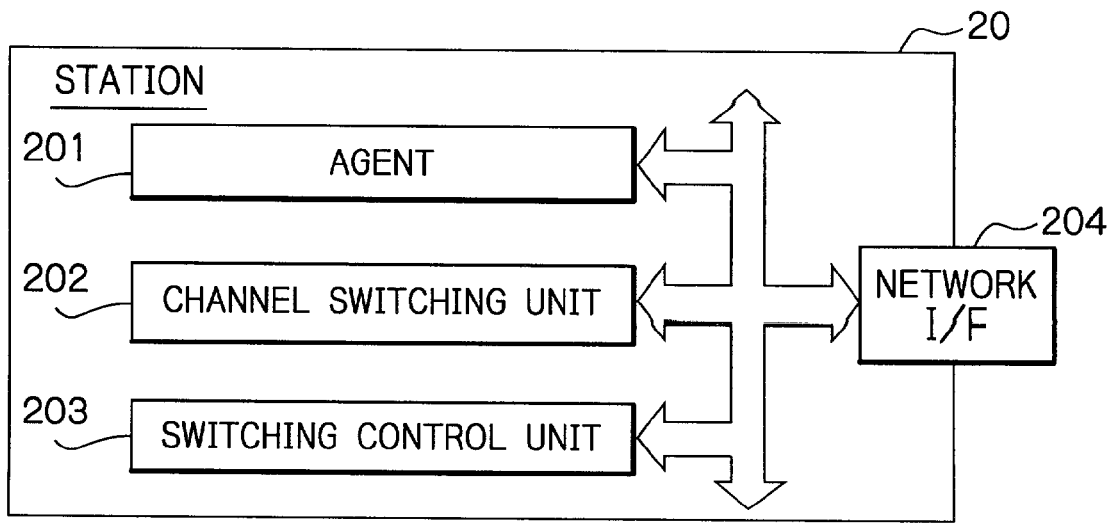
FIG. 6 shows a block diagram illustrating a configuration of a station according to the present invention.

FIG. 6 shows a block diagram illustrating a configuration of the station according to the present invention. As shown in FIG. 6, the station 20 consists of an agent 201, a channel switching unit 202, a switching control unit 203, and a network I/F unit 204.

The network I/F unit 204 has a fundamental function of the station. This function consists of creating, analyzing, sending and receiving of the packets for a wired and wireless LAN. The agent 201 counts the number of sent and received packets and the number of error packets. Also, the agent 201 sends a response packet to the switching apparatus 10, in response to a management request packet sent from the switching apparatus 10. Furthermore, the agent 201 receives a switching request packet sent from the switching apparatus 10, and transmits the request to the channel switching unit 202 and the switching control unit 203.

Figure 7:
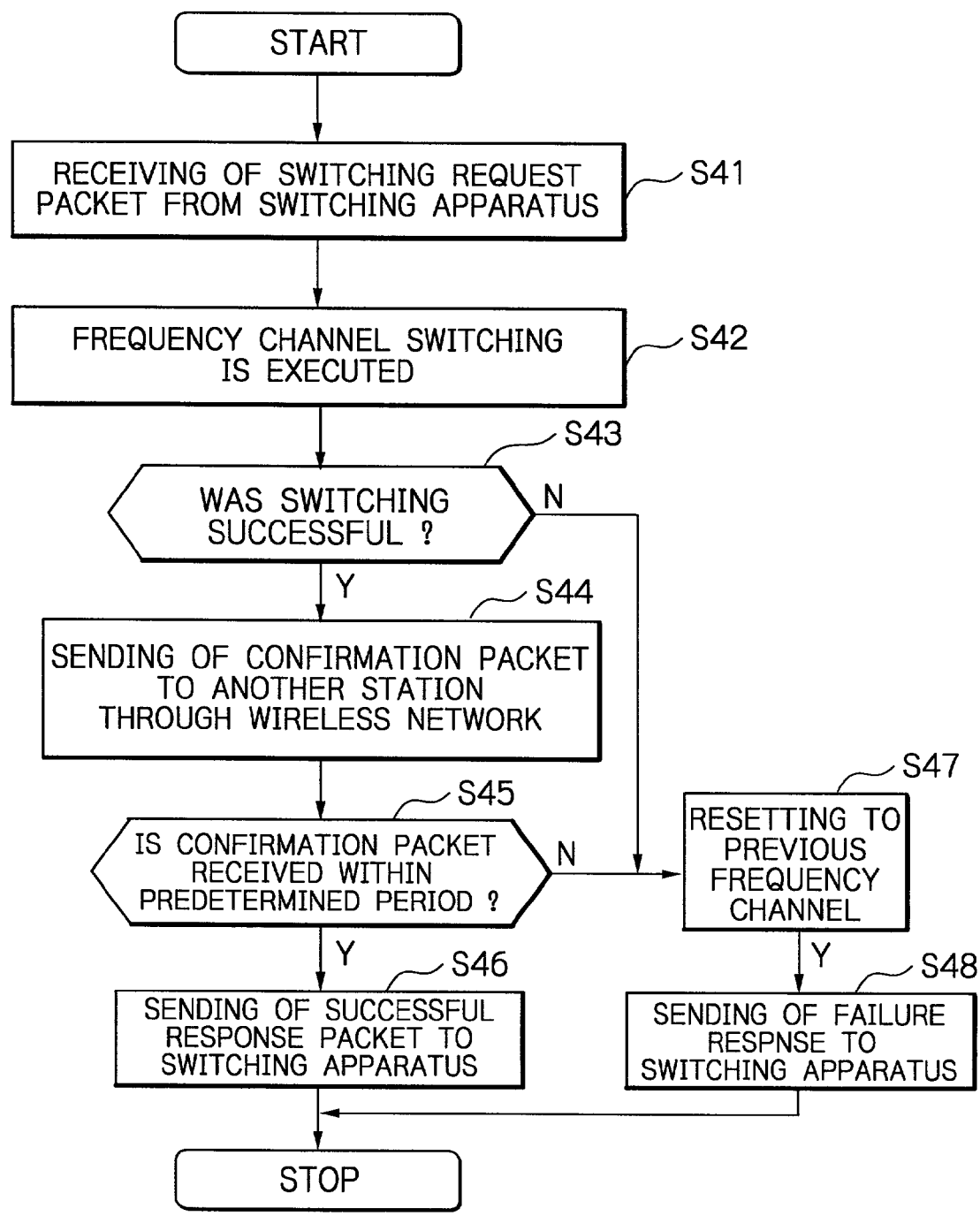
FIG. 7 shows a flowchart illustrating operations of the station.

FIG. 7 shows a flowchart illustrating operations of the station. At step S41, the agent 201 receives the switching request packet sent from the switching apparatus 10. At step S42, the channel switching unit 202 switches the current frequency channel to a frequency channel corresponding to the switching request packet.

At step S43, the channel switching control unit 203 checks whether the frequency channel switching was successful. If it succeeds, a confirmation packet is sent to another station through the wireless network at step S44. Another station also sends a confirmation packet similarly. Then, at step S45, it is judged that the confirmation packet is received within a predetermined period of time. If received within the period, it is judged that another station also succeeds in the switching of frequency channels. At step S46, the channel switching control unit 203 sends the response packet of the switching success to the switching apparatus 10.

If the frequency channel switching is failed at step S43, or if no confirmation packet is received within the predetermined period of time at step S45, the channel switching control unit 203 resets the frequency channel to the previous channel earlier than the switching at step S47. Then, at step S48, a failure response packet is sent to the switching apparatus 10.

As described above, the switching apparatus 10 located at a remote site can be possible to control the switching of frequency channels dynamically and unitarily through the network.

Furthermore, since it is possible to automatically reset the frequency channel to the previous channel when the frequency channel switching fails, the same frequency channel can be used between stations communicated with each other.

As explained in detail, according to the present invention, it is possible to detect a decline in the network quality of the wireless LAN automatically, and it is possible to dynamically switch the current frequency channel to a frequency channel unaffected by interference of the neighbor beams. Consequently, in the station that can use a plurality of frequency channels, the frequency channel can be automatically switched depending upon a line status, although it has been manually switched conventionally. Furthermore, a frequency channel unaffected by interference of the neighbor beams can be automatically selected.

Furthermore, according to the present invention, when the station malfunctions or when the switching request packet cannot be received, it is possible to prevent from putting the communication out of action due to inconsistence of the frequency channels.

Many widely different embodiments of the present invention may be constructed without departing from the spirit and scope of the present invention. It should be understood that the present invention is not limited to the specific embodiments described in the specification, except as defined in the appended claims.

What is claimed is:

1. A wireless LAN system comprising:
    a plurality of wireless stations; each station having a means for switching a frequency channel from a channel being used to a channel identified by a switching request packet;
    a switching apparatus for switching a frequency channel used between stations for communication, the switching apparatus having a means for selecting a frequency channel, and a means for sending a switching request packet that identifies the selected frequency channel to the stations upon expiration of a polling period; and
    a switching control unit having a switching control means for controlling a switching of frequency channels;
    wherein the means for selecting a frequency channel selects a frequency channel based on line status information regarding total number of packets and number of error packets;
    the switching control means sends a switching confirmation packet to the stations; the switching control means receives a switching confirmation packet from stations that switch frequency channels from the channel being used to the channel identified by the switching request packet in response to the switching request packet sent by the switching apparatus; when the switching control means does not receive a switching confirmation packet from a station, the switching control means resets the frequency channel to a frequency channel that was being used prior to receiving the switching request packet; and, in order to report a switching result, the switching control means sends a response packet to the switching apparatus indicating whether a switching confirmation packet has been received from each station.

2. A wireless LAN system comprising:
    a plurality of wireless stations; each station having a means for switching a frequency channel from a channel being used to a channel identified by a switching request packet; each station having an agent for sending a line status information to a manager in a switching apparatus; and
    the switching apparatus for switching a frequency channel used between stations for communication; the switching apparatus having a means for selecting a frequency channel and a means for sending a switching request packet that identifies the selected frequency channel to the stations; the switching apparatus having a manager for collecting a line status information indicating the varying status of lines between the stations, total number of packets, and number of error packets; and, the switching apparatus having a means for judging whether a frequency channel should be switched based on the line status information;
    a switching control unit having a switching control means for controlling a switching of frequency channels;
    wherein the selecting means in the switching apparatus selects the frequency channel based on a judgment of the judging means;
    the switching control means sends a switching confirmation packet to the stations; the switching control means receives a switching confirmation packet from stations that switch frequency channels from the channel being used to the channel identified by the switching request packet in response to the switching request packet sent by the switching apparatus; when the switching control means does not receive a switching confirmation packet from a station, the switching control means resets the frequency channel to a frequency channel that was being used prior to receiving the switching request packet; and, in order to report a switching result, the switching control means sends a response packet to the switching apparatus indicating whether a switching confirmation packet has been received from each station.

3. A system as claimed in claim 2, wherein the manager in the switching apparatus communicates with the agent in the station based on Simple Network Management Protocol.

4. A system as claimed in claim 2, wherein the selecting means in the switching apparatus selects a frequency channel so that a polarized wave of the frequency channel to be selected does not overlap polarized waves of neighboring frequency channels.

5. A system as claimed in claim 2, wherein when at least one of the switching results received from the stations indicates an unsuccessful frequency channel switch, the switching control means in the switching apparatus sends a switching request packet to all of the stations so that each station is reset to the frequency channel that was being used prior to receiving a switching request packet.

6. A system as claimed in claim 2, wherein the stations consist of one parent-station and a plurality of child-stations; the agent in the parent-station and each child-station calculates a percentage value of the number of success packets in relation to the total number of packets for each wireless link between the parent-station and each child-station, and sends a percentage value for each wireless link to the switching apparatus; the manager in the switching apparatus receives the percentage value; and the switching judgment means judges based on the number of wireless links for which the percentage value is smaller than a threshold whether a frequency channel should be switched.

7. A system as claimed in claim 6, wherein the switching judgment means in the switching apparatus dynamically modifies the threshold based on the number of switching times per unit time.

8. A method for a switching apparatus switching frequency channels used for communication between stations for a wireless LAN, the method comprising:
    (1) the switching apparatus selecting a frequency channel to be used based on line status information including total number of packets and number of error packets;
    (2) the switching apparatus sending a switching request packet to the stations that identifies the selected frequency channel upon expiration of a polling period; and (3) the station receiving the switching request packet, and switching from a frequency channel being used to the frequency channel identified by the switching request packet; and, (4) a switching control step for controlling a switching of frequency channels; the stations sending each other a switching confirmation packet; the stations receiving a switching confirmation packet from stations that switch frequency channels from the channel being used to the channel identified by the switching request packet received from the switching apparatus; when the switching confirmation packet is not received from a station, resetting the frequency channel to a frequency channel that was being used prior to receiving the switching request packet; and, in order to report a switching result, sending a response packet to the switching apparatus indicating whether the switching confirmation packet has been received from each station.

9. A method for a switching apparatus switching frequency channels used for communication between stations for a wireless LAN, the method comprising:

(1) the switching apparatus selecting a frequency channel to be used based on line status information including total number of packets and number of error packets;

(2) the switching apparatus sending a switching request packet that identifies the selected frequency channel to the stations;

(3) the stations receiving the switching request packet, and switching from a frequency channel being used to the frequency channel identified by the switching request packet;

(4) the switching apparatus collecting a line status information indicating the varying status of lines between the stations, and judging from the line status information whether a frequency channel should be switched;

(5) the station sending the line status information to the switching apparatus;

(6) the switching apparatus in step (1) selecting the frequency channel based on a judgment of the judging step (4); and (7) a switching control step for controlling a switching of frequency channels; the stations sending each other a switching confirmation packet; the stations receiving a switching confirmation packet from stations that switch frequency channels from the channel being used to the channel identified by the switching request packet received from the switching apparatus; when the switching confirmation packet is not received from a station, resetting the frequency channel to a frequency channel that was being used prior to receiving the switching request packet; and, in order to report a switching result, sending a response packet to the switching apparatus indicating whether the switching confirmation packet has been received from each station.

10. A method as claimed in claim 9, wherein said line status information includes information of the total number of packets and the number of error packets.

11. A method as claimed in claim 10, wherein said switching apparatus communicates with said station based on Simple Network Management Protocol.

12. A method as claimed in claim 9, wherein the selecting step (1) in the switching apparatus selects a frequency channel so that a polarized wave of the frequency channel to be selected does not overlap a polarized wave of other neighboring frequency channels.

13. A method as claimed in claim 9, wherein when at least one of the switching results received from the stations indicates an unsuccessful frequency channel switch, the switching control step (7) sends a switching request packet to all of the stations so that each station is reset to the frequency channel that was being used prior to receiving the switching request packet.

14. A method as claimed in claim 9, wherein the stations consist of one parent-station and a plurality of child-stations; the parent-station and the child-stations calculate a percentage value per unit time of the number of success packets in relation to the total number of packets for each wireless link between the parent-station and each child-station; the line status information sending step (5) sends a percentage value for each wireless link to the switching apparatus; the switching apparatus receives percentage value; and the switching judgment step judges based on the number of wireless links for which the percentage value is smaller that a threshold whether a frequency channel should be switched.

15. A method as claimed in claim 14, wherein said switching judgment step in said switching apparatus dynamically modifies said threshold based on the number of switching times per unit time.

* * * * *